K. NEFF.
SLEIGH MOTOR.
APPLICATION FILED FEB. 17, 1914.

1,150,956.

Patented Aug. 24, 1915.
2 SHEETS—SHEET 2.

Witnesses
Hugh H. Ott,
R. M. Smith.

Inventor
Kurt Neff
By Victor J. Evans
Attorney

UNITED STATES PATENT OFFICE.

KURT NEFF, OF NEU-ULM, GERMANY.

SLEIGH-MOTOR.

1,150,956.  Specification of Letters Patent.  Patented Aug. 24, 1915.

Application filed February 17, 1914. Serial No. 819,294.

*To all whom it may concern:*

Be it known that I, KURT NEFF, a subject of the Emperor of Germany, residing at Marieustrasse 16, Neu-Ulm, Swabia, Germany, have invented new and useful Improvements in Sleigh-Motors, of which the following is a specification.

This invention relates to sleigh propelling mechanism the object in view being to provide simple and effective means for propelling a sleigh, the said propelling means being actuated by a motor carried by the sleigh where it is under control of the operator at all times, the propelling mechanism embodying a plurality of reciprocatory plungers operatively connected with a crank shaft which is driven by said engine.

With the above and other objects in view, the invention consists in the construction, combination and arrangement of parts, as will hereinafter be more fully described, illustrated and claimed.

Figure 1:
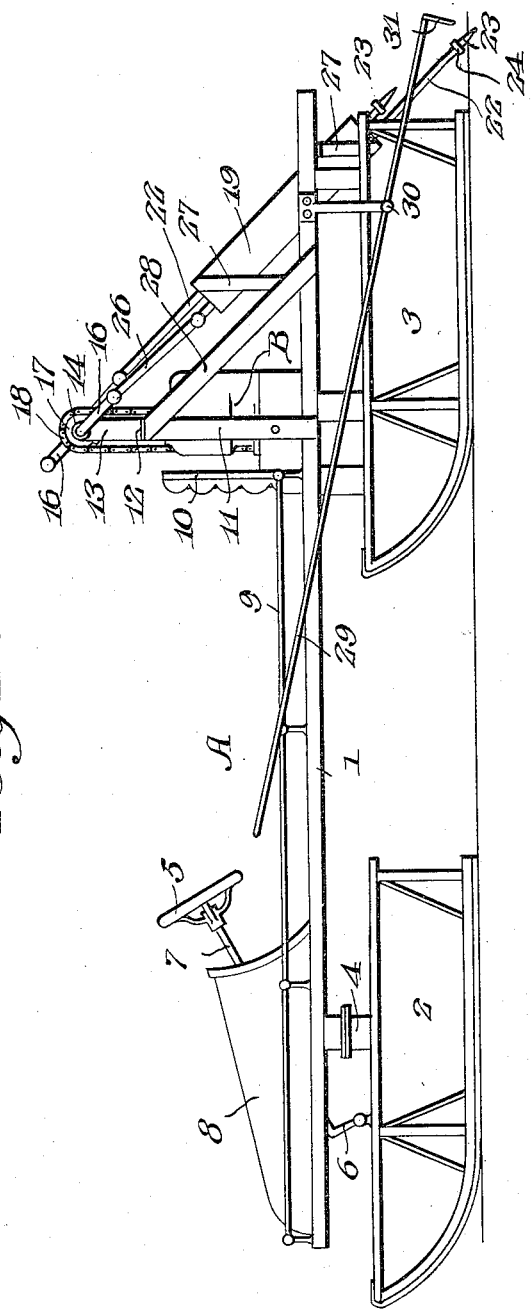
Figure 2:
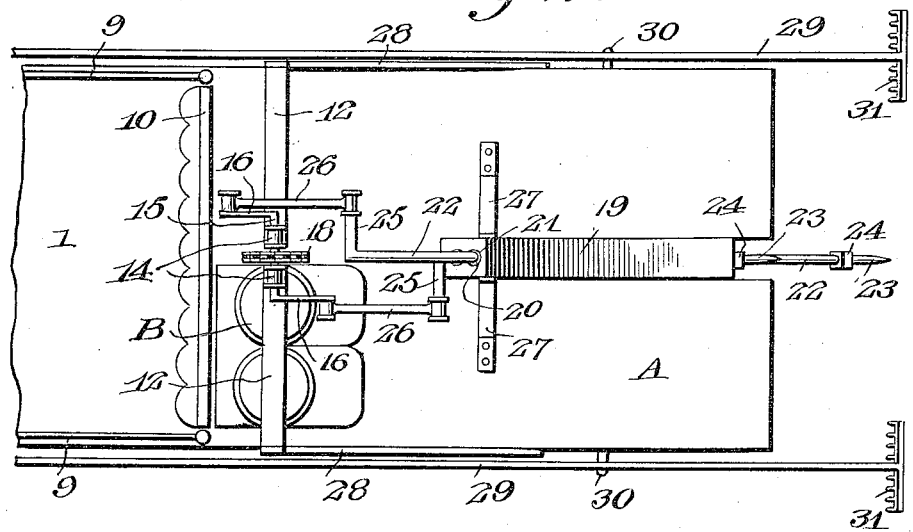
Figure 3:
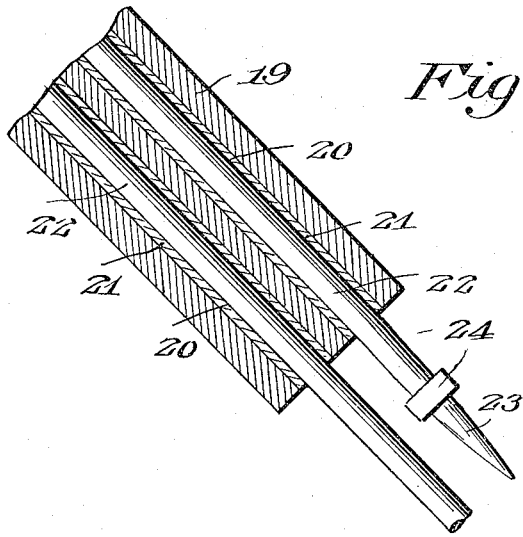

In the accompanying drawings:—Figure 1 is a side elevation of a complete sleigh having the propelling mechanism of this invention mounted thereon. Fig. 2 is a top plan view of a portion of the sleigh showing the propelling mechanism of this invention. Fig. 3 is a detail vertical longitudinal section showing the plunger rods and the guide therefor.

Referring to the drawings A designates generally a sleigh embodying a platform 1, front and rear bob sleds 2 and 3, respectively, a motor designated at B, and propelling mechanism driven by said motor and hereinafter particularly described.

The rear bob sled 3 may be rigidly connected to the platform 1 of the sleigh while the front bob sled 2 is provided with a bolster 4 which is pivotally connected to the platform A so as to turn on a vertical axis thereby enabling the sleigh to be steered.

5 designates the steering or control wheel similar to that used in automobiles, the shaft of said control wheel being connected by steering rods 6 to the forward portion of the bob sled 2 as shown so that by turning the wheel 5 the front bob sled may be turned for steering the machine laterally to one side or the other. The shaft 7 of the steering wheel passes through and is covered by a combined hood and wind shield 8 which tapers in a forward direction as shown.

9 designates hand rails for one or more occupants of the sleigh and 10 designates a back rest or support.

On the platform 1 in rear of the back support 10 the motor B is mounted. Just in front of the motor is an upstanding frame comprising parallel side standards 11 which are rigidly secured to the platform 1 and which at a suitable elevation are offset inwardly as shown at 12 and then extended upwardly to form bearing posts 13 provided at their upper extremities with bearings 14 in which is journaled a crank shaft 15 having oppositely set cranks 16 at the extremities thereof. Between the bearings 14 the shaft 15 has fast thereon a wheel 17 from which a chain or belt 18 extends downwardly to and is driven from the motor B.

19 designates a guide which is formed with parallel guide ways 20 arranged one above another as indicated in Fig. 1 and as shown in cross section in Fig. 3, each of said guide ways 20 being lined with a bushing 21. Mounted to reciprocate in rectilinear paths through the guide ways 21 are propelling plunger rods 22 which it will be observed are arranged one above another and at a sufficient distance apart to provide for the formation on the engaging ends or points 23 thereof of stop shoulders or collars 24 which serve to limit the penetration of the engaging points of the plunger rods into snow, ice or other road surface.

Each of the plunger rods 22 is offset in advance of the guide 19 as shown at 25 so as to avoid the bearing posts 13 and enable the forward extremities of said plunger rods to receive connecting rods 26 which extend from said plunger rods to the oppositely arranged cranks 16 as clearly shown in the plan view.

27 designates braces connecting the guide 19 with the platform 1 and 28 designates other inclined braces connecting the platform 1 with the frame in which the crank shaft 15 is journaled.

29 designates a forked lever the forward end of which is placed within reach of the operator of the machine, said forked lever being pivotally mounted on a horizontal axis at 30 and the arms of the forked lever being provided at their rear extremities with brakes 31 shown in the form of horizontal bars having downwardly extending teeth. By elevating the forward end of the forked lever 29, the brake shoes 31 may be moved downwardly so as to engage the road surface and bring the machine to a stop.

What I claim is:—

The combination with a sleigh, of propelling mechanism therefor comprising an engine, a crank shaft journaled on the sleigh and driven by said engine, and a plurality of propelling plunger rods operatively connected with and reciprocated by said crank shaft, said plunger rods being arranged one above another to operate in a common vertical plane.

In testimony whereof I affix my signature in presence of two witnesses.

KURT NEFF.

Witnesses:
 FRANZ ILEVER WALSER,
 ARTHUR BENZ.

Copies of this patent may be obtained for five cents each, by addressing the "Commissioner of Patents, Washington, D. C."